United States Patent Office 3,128,279
Patented Apr. 7, 1964

3,128,279
DIPHENYL METHANE DERIVATIVES AND METHODS FOR THE PREPARATION THEREOF
Richard William Temple, Marlow, and Leslie Frederick Wiggins, Wargrave-on-Thames, England, assignors to Aspro-Nicholas Limited, London, England, a company of Great Britain
No Drawing. Filed Oct. 8, 1959, Ser. No. 845,068
Claims priority, application Great Britain Oct. 14, 1958
11 Claims. (Cl. 260—295)

This invention relates to new diphenyl methane derivatives, which exhibit analgesic properties. Certain of these derivatives, in addition to being analgesics, are also potentiators of various drugs which affect the central nervous system.

According to one aspect of the present invention, there are provided diphenyl methane derivatives having the general formula:

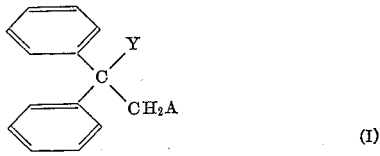
(I)

wherein Y represents a CN, CONH$_2$, COOH, COOM, COOR, COOR$_1$, COR$_1$ or

group; where M is an alkali metal, R is

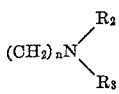

n being an integer less than 4, R$_1$ is a lower alkyl group, and R$_2$ and R$_3$ are lower alkyl groups optionally substituted, which groups may form together with the nitrogen atom attached thereto a saturated heterocyclic ring optionally containing a further nitrogen atom or an oxygen atom; and wherein A represents either a 2-, 3- or 4-pyridyl group, each optionally substituted by a lower alkyl group, or, when Y represents a COOR group, a phenyl group optionally substituted by one or more chlorine or bromine atoms or alkyl or alkoxy groups containing up to 5 carbon atoms.

The term "lower alkyl group" is used as meaning an alkyl group containing from one to four carbon atoms.

According to another aspect of the invention, there are provided methods for preparing compounds of the general Formula I above.

When Y in the Formula I is a nitrile group, the compounds of the present invention have the general formula:

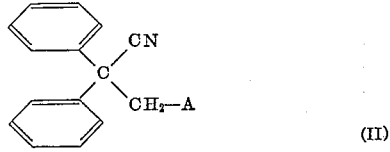
(II)

where A has the meaning defined above, and may be prepared by condensing diphenylacetonitrile in an inert solvent, preferably benzene, toluene or xylene, and in the presence of a condensing agent, preferably sodium hydride, with a picolyl chloride having the general formula:

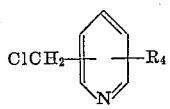
(III)

wherein R$_4$ is hydrogen or a lower alkyl group.

When Y in the Formula I is a CONH$_2$, COOH or COOR$_1$ group the compounds have the general formula:

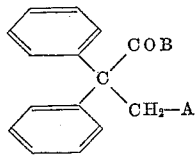
(IV)

where B is NH$_2$, OH or OR$_1$ (where R$_1$ is lower alkyl group), and A has the meaning defined above. Compounds of the general Formula IV may be prepared by the hydrolysis or alcoholysis of the nitriles of general Formula II. Thus when B in Formula IV is NH$_2$, the compound can be made from the nitriles of Formula II by alkaline hydrolysis, preferably using sodium or potassium hydroxide, in a solvent, e.g. aqueous propylene glycol. When B in Formula IV is OH, the compounds can be made by acid hydrolysis of the nitriles of Formula II, for example by hydrolysis with 70% sulphuric acid, and when B in Formula IV is OR$_1$, the compounds can be made by subjecting the nitriles of Formula II to an alcoholysis reaction with an acid, for example sulphuric acid, and an alcohol of the general formula R$_1$OH.

The invention further provides another method of making esters of the general Formula IV, where B is OR$_1$ (R$_1$ being a lower alkyl group preferably an ethyl or methyl group) by reaction of the appropriate ester of diphenylacetic acid with sodium hydride in an inert solvent, for example xylene, at a temperature above 120° C. to give the corresponding sodio-derivative and subsequent reaction of said sodio-derivative with a picolyl chloride of the general Formula III, preferably a 2-picolyl chloride, 3-picolyl chloride, 4-picolyl chloride or 6-methyl-2-picolyl chloride.

When Y in Formula I is COR$_1$, the compounds have the general formula:

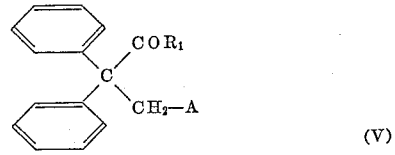
(V)

where R$_1$ is a lower alkyl group and A is as defined previously. These compounds may be obtained by reacting the nitriles of the general Formula II with a Grignard reagent of the formula R$_1$MgX and decomposing the resulting complex by acid hydrolysis. Particularly good results are obtained when the group A in the nitrile of Formula II is a 2-pyridyl group or a 2-pyridyl group substituted in the 6-position with a methyl or ethyl group.

When Y in Formula I is

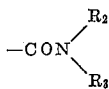

the compounds have the general formula:

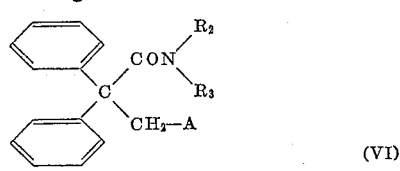
(VI)

wherein R$_2$, R$_3$ and A have the meanings defined above. These compounds may be prepared by reacting an appropriately substituted amide of diphenylacetic acid with sodium hydride in an inert solvent, for example xylene, at temperatures above 120° C. to produce the corresponding sodio-derivative and then reacting said sodio-derivative with a picolyl chloride having the general Formula III above.

Preferably

is a dimethylamino, diethylamino, 1-pyrrolidinyl, piperidino, morpholino or a 1-(4-methyl)-piperazinyl group.

When Y in the general Formula I is COOR, the compounds have the general formula:

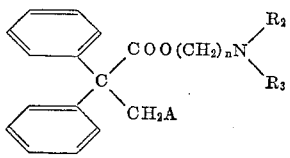

(VII)

wherein $n$, $R_2$ and $R_3$ have the meanings defined above, and A is a 2-, 3- or 4-pyridyl group, each optionally substituted by a lower alkyl group, or a phenyl group optionally substituted by one or more chlorine or bromine atoms or alkyl or alkoxy groups containing up to 5 carbon atoms. The compounds of general Formula VII may be prepared by refluxing the sodium or potassium salt of an acid having the general formula:

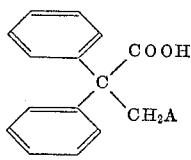

wherein A has the meaning defined above, with an amino alkyl chloride of the formula:

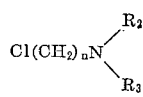

wherein $n$, $R_2$ and $R_3$ have the meanings defined above, in a lower aliphatic alcohol solvent, preferably ethyl alcohol.

The compounds having the general Formula VII above are not only analgesics but are also potentiators of various drugs which affect the central nervous system.

When Y is general Formula I is COOM, the compounds have the general formula:

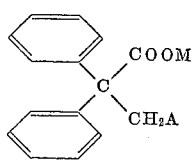

(VIII)

where M is an alkali metal, preferably sodium or potassium, and A has the meaning defined above. The compounds of general Formula VIII may be prepared by reacting a diphenyl methane carboxylic acid derivative having the general Formula IV, where B is OH, with an equivalent amount of an alkali metal lower alkoxide dissolved in the corresponding alcohol. Preferably sodium ethoxide in ethyl alcohol is employed.

The basic compounds obtained by the above processes may be converted into their respective salts by means of organic or inorganic acids. As inorganic acids there may be used, for example, hydrohalic acids, phosphoric acid, or sulphuric acid, and as organic acids there may be used, for example, oxalic acid, acetic acid, lactic acid, succinic acid, maleic acid, tartaric acid, citric acid or salicylic acid.

The following examples illustrate the invention.

*Example 1*

Diphenylacetonitrile (19.2 g.), dry xylene (100 mls.) and 5.0 g. of a 50% suspension of sodium hydride in oil were heated at 80° C., until hydrogen evolution ceased, when 14 g. of 2-picolyl chloride in 20 mls. of dry xylene were added slowly and heating was continued for one hour. The mixture was washed with water and extracted with 200 mls. of normal hydrochloric acid. The acid layer precipitated the hydrochloride of 1:1-diphenyl-2-(2'-pyridyl)-propionitrile on standing. The melting point of the product was 205–210° C. (decomposition), which was raised to 208–212° C. (decomposition), by crystallisation from methanol-acetone.

The free base was obtained from a solution of the hydrochloride in aqueous methanol by basifying with potassium hydroxide solution. It was crystallised from a mixture of benzene and petroleum ether to give a melting point of 116–118° C.

*Example 2*

Diphenylacetonitrile (9.6 g.) in dry xylene (50 mls.) and 2.5 g. of a 50% suspension of sodium hydride in oil were heated at 90° C. with stirring until hydrogen evolution ceased, when 6.8 g. of 4-picolyl chloride in dry xylene (10 mls.) were added over 10 minutes. The mixture was heated at 100° C. for one and a half hours. After cooling the xylene solution was washed twice with water, and then heated with a little charcoal and filtered. The solution obtained was extracted with warm normal hydrochloric acid (150 mls.). The acid layer on cooling precipitated the hydrochloride of 1:1-diphenyl-2-(4'-pyridyl)-propionitrile of melting point 218–224° C. which was raised to 222–225° C. by crystallisation from ethanol-acetone.

The free base, obtained as in the preceding example, melted at 123–125° C. after crystallisation from a mixture of benzene and petroleum ether.

*Example 3*

Diphenylacetonitrile (14.4 g.) in dry xylene (75 mls.) and 3.8 g. of a 50% suspension of sodium hydride in oil were heated at 100° C. until hydrogen evolution ceased, when 12 g. of 6-methyl-2-picolyl chloride in 10 mls. of dry xylene were added. After heating at 100° C. for 2 hours the mixture was cooled and washed twice with water, then extracted with 200 mls. of warm normal hydrochloric acid. The acid layer on cooling precipitated the hydrochloride of 1:1-diphenyl-2-(2'-(6'-methyl pyridyl)) propionitrile of melting point 213–217° C. after crystallisation from ethanol-acetone.

The free base melted at 122–124° C. after crystallisation from aqueous methanol.

*Example 4*

4.0 g. of a 50% suspension of sodium hydride in oil were added to diphenylacetonitrile (16 g.) dissolved in dry xylene (100 mls.) and the mixture heated at 100° C. with stirring until hydrogen evolution ceased. 3-picolyl chloride (10. 8 g.) in xylene (30 mls.) was added over 15 minutes and the mixture heated at 120° C. for 2½ hours. After cooling the solution was washed twice with water and then extracted with 200 mls. of warm normal hydrochloric acid. The acid layer precipitated the hydrochloride of 1:1-diphenyl-2-(3'-pyridyl) propionitrile on cooling. The hyrochloride was dissolved in aqueous methanol and basified with potassium hydroxide solution when the free base was precipitated. It has a melting point of 128–132° C., which was raised to 131–133° C. by crystallisation from a mixture of benzene and petroleum ether.

*Example 5*

1:1-diphenyl-2-(2'-pyridyl)-propionitrile (1 g.), water (0.3 mls.), sodium hydroxide (2 g.) and propylene glycol (6 mls.) were refluxed for 20 minutes, then cooled and diluted with water. The precipitated solid was crystallised from a mixture of benzene and petroleum ether to give 1:1-diphenyl-2-(2'-pyridyl)-propionamide of melting point 146–149° C.

Example 6

1:1-diphenyl-2-(2'-pyridyl)-propionitrile (2 g.) was dissolved in a mixture of methanol (5 ml.) and sulphuric acid (1 ml.) and refluxed for 2 hours, and then cooled and diluted with water. The precipitated gum was washed by decantation with water, then stirred with aqueous methanol until solid. Recrystallisation from petroleum ether gave methyl-1:1-diphenyl-2-(2'-pyridyl)-propionate, M.P. 71–73° C.

Example 7

1:1-diphenyl-2(2'-pyridyl)-propionitrile (2 g.) was dissolved in 90% sulphuric acid (5 mls.) and heated at 100° C. for 2 hours. After cooling the mixture was diluted with water and basified with sodium hydroxide solution. A small amount of precipitate was filtered off and the filtrate was neutralised with hydrochloric acid to give a precipitate of 1:1-diphenyl-2-(2'-pyridyl)-propionic acid, M.P. 200–202° C. (decomp.).

Example 8

Ethyl magnesium bromide in ether was prepared from 0.85 g. of magnesium and 3.8 g. of ethyl bromide, and into this solution were run 4.0 g. of 1:1-diphenyl-2-(2'-(6'-methylpyridyl))-propionitrile in dry xylene (40 mls.). The mixture was heated slowly to 100° C. when precipitation began. After heating for 1 hour the solution was cooled and poured into ice-cold 10% hydrochloric acid (30 mls.), which was then stirred and heated to boiling. The aqueous layer was separated and cooled to give a precipitate of the hydrochloride of 1-(2'-(6-methyl-pyridyl))-2:2-diphenyl pentane-3-one. This was purified by dissolving in aqeous ethanol and basifying with dilute ammonia to precipitate the free base, which crystallised from petroleum ether, and had a melting point of 103–105° C. The pure hydrochloride was made by dissolving the free base in a mixture of dry ether and benzene and passing in dry hydrochloric acid gas until precipitation was complete. The pure hydrochloride crystallised from ethanol-acetone with a melting point of 220–224° C.

Example 9

Ethyl magnesium bromide in ether was prepared from 3.4 g. of magnesium and 15.2 g. of ethyl bromide, and into this solution was run 1:1-diphenyl-2-(2'-pyridyl)-propionitrile (18 g.) dissolved in 120 mls. of dry xylene. A white precipitate was formed and the mixture was heated to 90° C. and kept at that temperature for 1 hour. After cooling the mixture was poured on to ice-cold 10% hydrochloric acid (160 mls.) and heated to boiling. The acid layer was separated and cooled, precipitating the crude hydrochloride of 1-(2'-pyridyl)-2:2-diphenyl-pentane-3-one, melting point 210–215° C.

The hydrochloride was dissolved in aqueous methanol and basified with dilute ammonia to give the free base, melting point 71–73° after crystallisation from petroleum ether.

The pure hydrochloride was made by dissolving the base in benzene and passing in dry hydrochloric acid gas. It crystallised from methanol-acetone with a melting point of 223–226° C.

Example 10

To 35 g. of methyldiphenylacetate in 180 mls. of dry xylene were added 7.9 g. of a 50% suspension of sodium hydride in oil and the mixture was heated at 130° C. until hydrogen evolution ceased. 6-methyl-2-picolyl-chloride (25 g.) in dry xylene (30 mls.) was dropped slowly into the resulting mixture. When the addition was completed heating was continued until reflux commenced. After one hour the solution was cooled and washed twice with water, then extracted with 200 mls. of twice normal hydrochloric acid. The acid extract was washed once with ether, then neutralised with concentrated ammonium hydroxide. The precipitated oil solidified on scratching to give crude methyl-1:1-diphenyl-2-(2'-(6'-methyl-pyridyl)-propionate, melting point 80–84° C. which was raised to 88–90° C. by crystallisation from petroleum ether.

The hydrochloride melted at 170–172° C. with decomposition after crystallisation from acetone-ether.

Example 11

Methyl-1:1-diphenyl-2-(2'-(6'-methyl-pyridyl))-propionate (12 g.) was refluxed with potassium hydroxide (15 g.), water (10 mls.) and ethanol (50 mls.) for 9 hours. After cooling the solution was diluted with water (50 mls.) then washed twice with ether and neutralised with hydrochloric acid. The precipitated 1:1-diphenyl-2-(2'-(6'-methyl-pyridyl))-propionic acid melted at 193–195° C. with decomposition after crystallisation from ethanol.

Example 12

50 g. of methyl diphenyl acetate in 250 mls. of dry xylene and 11.5 g. of a 50% suspension of sodium hydride in oil were heated at 130–150° C. until hydrogen evolution ceased. 30 g. of 2-picolyl chloride in dry xylene (40 mls.) were added over a period of 15 minutes, and the mixture was then refluxed for 1½ hours. After cooling the xylene solution was washed with water and then extracted with 400 mls. of twice normal hydrochloric acid. The acid extract was washed with ether and then neutralised with ammonia solution. The precipitated oil was extracted with ether and the ether solution was dried with magnesium sulphate. Dry hydrochloric acid gas was passed into the solution until precipitation of the hydrochloride was complete. The precipitate was crystallised from methanol-acetone to give methyl 1:1-diphenyl-2-(2'-pyridyl)-propionate hydrochloride, melting point 165–168° C. with decomposition. The free base crystallised from petroleum ether with a melting point of 71–73° C.

Example 13

24 g. of ethyl diphenyl acetate in 200 mls. of dry xylene and 4.8 g. of a 50% suspension of sodium hydride in oil were heated at 130° C. until hydrogen evolution ceased. 12.8 g. of 2-picolyl chloride in dry xylene (20 mls.) were added over a period of 10 minutes and the mixture was then refluxed for one hour. After cooling, the solution was washed with water and then extracted with 400 mls. of normal hydrochloric acid. The acid extract was washed with ether and then basified with dilute ammonium hydroxide solution. The precipitated oil was ether extracted and after drying the ether solution, dry hydrochloric acid gas was passed in until precipitation of the hydrochloride was complete. Recrystallisation from ethanol-ether gave ethyl 1:1-diphenyl-2-(2'-pyridyl)-propionate hydrochloride, melting point 210–213° C. (decomposition).

Example 14

15 g. of ethyl diphenyl acetate in dry xylene (80 mls.) and 3.2 g. of a 50% suspension of sodium hydride in oil were heated at 130° C. until hydrogen evolution ceased. 9.5 g. of 6-methyl-2-picolyl chloride in dry xylene (20 mls.) were added over a period of 10 minutes and the mixture was refluxed for two hours. After cooling the solution was washed with water and then extracted with 200 mls. of normal hydrochloric acid. The acid extract was washed with ether and then basified with dilute sodium hydroxide. The precipitated oil was taken up in ether, dried, and dry hydrochloric acid gas was passed in until precipitation of the hydrochloride was complete. The hydrochloride was recrystallised from a mixture of ethanol and ether to give ethyl 1:1-diphenyl-2-(2'-(6'-methyl-pyridyl))-propionate hydrochloride, melting point 194–197° C. with decomposition.

Example 15

Methyl 1:1-diphenyl-2-(4'-pyridyl)-propionate (1 g.)

and sodium hydroxide (1.5 g.) dissolved in a mixture of water (4 mls.) and ethanol (16 mls.) were refluxed for 13 hours. Most of the ethanol was distilled off and water (10 mls.) was added. The solution was washed with ether, and then neutralised with hydrochloric acid to give 1:1-diphenyl-2-(4'-pyridyl)-propionic acid, melting point 230–232° C. with decomposition, after recrystallisation from ethanol.

*Example 16*

Methyl diphenyl acetate (40 g.) in dry xylene (200 mls.) and a 50% suspension of sodium hydride in oil were heated at 130° C. until hydrogen evolution ceased, when 4-picolyl chloride (23.5 g.) in dry xylene (20 mls.) was dropped into the mixture over a period of 10 minutes. The temperature was raised until reflux started and was maintained there for 2 hours. After cooling the solution was washed with water, then extracted with 400 mls. of twice normal hydrochloric acid. The acid solution was basified with dilute ammonia and the precipitated oil was scratched until it solidified. The solid was crystallised from aqueous methanol with charcoaling to give methyl 1:1-diphenyl-2-(4'-pyridyl)-propionate, melting point 146–149° C. The hydrochloride melted at 180–183° C. with decomposition after crystallisation from a mixture of methanol and acetone.

*Example 17*

To 1:1:2-triphenylpropionic acid (4.6 g.), dissolved in dry ethanol (10 mls.) a solution of sodium ethoxide in dry ethanol (prepared from 0.36 g. of sodium and 7 mls. of ethanol) was added, followed by β-diethylamino ethyl chloride (2.05 g.) in dry ethanol (5 mls.). After refluxing for 1.5 hours, the solution was cooled and sodium chloride was filtered off. After most of the ethanol had been distilled off, water was added, and the precipitated gum was extracted with ether. The ethereal extract was washed twice with water and dried. Gaseous dry hydrochloric acid gas was passed into the ether solution and when absorption was complete the precipitated gum was crystallised from acetone-ether to give β-diethylaminoethyl 1:1:2-triphenyl propionate hydrochloride as rosettes of melting point 143–146° C.

*Example 18*

1:1-diphenyl-2-(2'-(6'-methylpyridyl))-propionic acid (7.2 g.), dry ethanol (50 mls.) and a solution of sodium ethoxide in dry ethanol (from 1.15 g. of 50% sodium hydride in oil and 20 mls. of dry ethanol) were heated on the steam bath for 20 minutes. To the suspension of the sodium salt obtained, β-diethyl aminoethyl chloride (3.3 g.) was added and the mixture was refluxed for 1.5 hours. Most of the ethanol was then distilled off and water was added. The precipitated gum was extracted with ether and the extract was washed with water and dried. Dry hydrochloric acid gas was passed with the ether solution and the precipitated gum was triturated with benzene. The residue was crystallised from ethanol-ether to give β-diethylaminoethyl-1:1-diphenyl-2-(2'-(6'-methylpyridyl))-propionate dihydrochloride as prisms of melting point 144–147° C.

*Example 19*

1:1-diphenyl-2-(2'-(6'-methylpyridyl))-propionic acid (10 g.), dry ethanol (40 mls.) and a solution of sodium ethoxide in dry ethanol (prepared from 1.55 g. of 50% sodium hydride in oil and 10 mls. of dry ethanol) were refluxed for 15 minutes, then cooled. Dry ether (50 mls.) was added and the sodium salt of 1:1-diphenyl-2-(2'-(6'-methylpyridyl))-propionic acid was collected, washed with ether and dried.

We claim:

1. A compound selected from the group conisting of compounds of the formula:

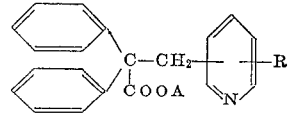

wherein A is selected from the group consisting of hydrogen, alkali metal, lower alkyl, and tertiary amino having the formula $(CH_2)_n(NR_2R_3)$, wherein $n$ is an integer from 1 to 3, and $R_2$ and $R_3$ are lower alkyl, and R is selected from the group consisting of hydrogen and lower alkyl; and pharmacologically acceptable acid addition salts thereof.

2. A compound selected from the group consisting of compounds of the formula:

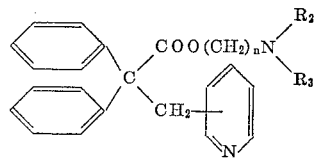

wherein $n$ is an integer from 1 to 3, $R_2$ and $R_3$ are lower alkyl; and pharmacologically acceptable acid addition salts thereof.

3. A compound selected from the group consisting of compounds of the formula:

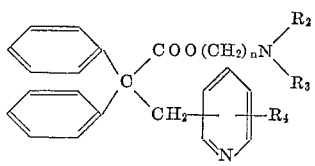

wherein $n$ is an integer from 1 to 3, and $R_2$, $R_3$ and $R_4$ are lower alkyl; and pharmacologically acceptable acid addition salts thereof.

4. A compound selected from the group consisting of compounds of the formula:

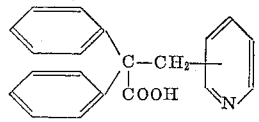

and pharmacologically acceptable acid addition salts thereof.

5. A compound selected from the group consisting of compounds of the formula:

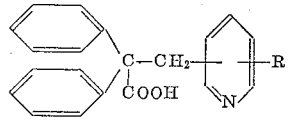

wherein R is lower alkyl; and pharmaceutically acceptable acid addition salts thereof:

6. A compound selected from the group consisting of compounds of the formula:

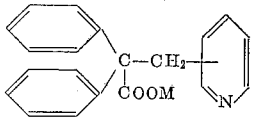

wherein M is an alkali metal; and pharmacologically acceptable acid addition salts thereof.

7. A compound selected from the group consisting of compounds of the formula:

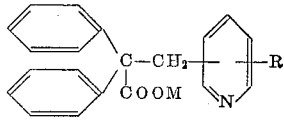

wherein M is an alkali metal and R is lower alkyl; and pharmacologically acceptable acid addition salts thereof.

8. A compound selected from the group consisting of compounds of the formula:

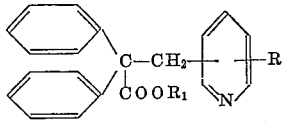

wherein R and $R_1$ are lower alkyl; and pharmacologically acceptable acid addition salts thereof.

9. A compound selected from the group consisting of compounds of the formula:

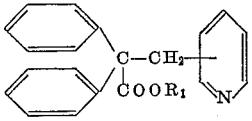

wherein $R_1$ is lower alkyl; and pharmacologically acceptable acid addition salts thereof.

10. Methyl 1:1-diphenyl-2-(2'-pyridyl)-propionate and its hydrochloride.

11. 1:1-diphenyl-2-(2'-pyridyl)-propionic acid.

References Cited in the file of this patent

UNITED STATES PATENTS

| | | |
|---|---|---|
| 2,649,455 | Walter et al. | Aug. 17, 1953 |
| 2,713,050 | Walter et al. | July 12, 1955 |
| 2,713,051 | Walter et al. | July 12, 1955 |